United States Patent

Novotny

[11] Patent Number: 5,135,354
[45] Date of Patent: Aug. 4, 1992

[54] GAS TURBINE BLADE AND DISK

[75] Inventor: Rudolph J. Novotny, Stuart, Fla.

[73] Assignee: United Technologies Corporation, Hartford, Conn.

[21] Appl. No.: 584,556

[22] Filed: Sep. 14, 1990

[51] Int. Cl.$^5$ .............................. F01D 5/14
[52] U.S. Cl. .................... 415/115; 415/116; 416/193 A; 416/214 A; 416/248
[58] Field of Search ............. 415/115, 116, 117, 95, 415/96 R, 97 R, 90 R, 93 R; 416/214 A, 193 A, 248

[56] References Cited

U.S. PATENT DOCUMENTS

| 2,354,304 | 7/1944 | Celio | 416/214 A |
|---|---|---|---|
| 2,401,826 | 6/1946 | Halford | 60/41 |
| 2,988,325 | 6/1961 | Dawson | 415/115 X |
| 2,994,507 | 8/1961 | Keller et al. | 416/193 A X |
| 3,043,560 | 7/1962 | Varadi | 253/39.15 |
| 3,742,706 | 7/1973 | Klompas | 415/115 X |
| 3,832,090 | 8/1974 | Matto | 416/95 |
| 3,834,831 | 9/1974 | Mitchell | 416/193 A X |
| 4,097,194 | 6/1978 | Barack et al. | 416/214 A X |
| 4,102,603 | 7/1978 | Smith et al. | 416/244 A |
| 4,178,129 | 12/1979 | Jenkinson | 416/95 |
| 4,415,310 | 11/1983 | Bouiller et al. | 415/115 X |
| 4,422,827 | 12/1983 | Buxe et al. | 416/193 A |
| 4,451,205 | 5/1984 | Honda et al. | 416/193 A X |
| 4,759,688 | 7/1988 | Wright et al. | 416/95 |
| 4,995,788 | 2/1991 | Turnberg | 416/248 X |

FOREIGN PATENT DOCUMENTS

| 55102 | 8/1943 | Netherlands | 416/214 A |
|---|---|---|---|
| 109864 | 12/1945 | Sweden | 416/214 A |
| 359350 | 10/1931 | United Kingdom | |

Primary Examiner—Edward K. Look
Assistant Examiner—Todd Mattingly
Attorney, Agent, or Firm—Edward L. Kockey, Jr.

[57] ABSTRACT

Each of a pair of axially spaced turbine disks (12,14) has a plurality of blade retention fingers (20) at the periphery. Each blade has a pair of chevrons (64,66), one engaging a contiguous chevron (70) on a corresponding disk finger. The interacting chevron surfaces are located on the center plane (74) of a corresponding disk. Each finger is shaped to have a linear locus (75) of neutral axis (77) from the body of the disk to the chevron location. Each blade has a hollow platform structure (24), structural members (86,88,92,94) associated with a chevron (70), an airfoil extension (63) extending through the platform (28). High temperature cooling air (34) is directed into the blades (32,26,22) while being baffled away (42) from the turbine disks (12,14). Low temperature cooling air (48) bathes the live disks.

22 Claims, 5 Drawing Sheets

GAS TURBINE BLADE AND DISK

DESCRIPTION

1. Technical Field

The invention relates to high temperature, high rpm gas turbines and in particular to a structure securing the blades to disks.

2. Background of the Invention

In gas turbine engines for aircraft it is desirable to have a more compact structure with a higher thrust to weight ratio. This leads to higher revolutions per minute turbines and increased flow area. The increased flow area dictates longer blades and/or larger diameter, which in turn leads to higher loading.

The structural limits are set by the disk size and capacity of the turbine blade-to-disk attachments. Conventional disks have a bore, a web and a wide rim. The rim is required to distribute the wide blade load. This rim, while lowly stressed as a full hoop, contributes on the order of 40 percent of the disk weight.

Operation can be expected at 10,000 rpm producing blade loadings of 100,000 G. In order to meet the higher rpms and flow size requirements, the disks have been getting heavier and thicker. This reduces the material properties since the thicker parts cannot be properly heat treated. This has led to higher than desirable stresses on the component because of the high forces. It has also led to slow thermal response affecting not only clearances in the turbine, but internal stresses caused by thermal differential within the disk.

SUMMARY OF THE INVENTION

An object of the invention is to achieve higher rpm operation of high temperature gas turbines with low weight, acceptable stress and thermal response. Longer life of operation is accomplished.

Dual small thickness disks support the array of blades. Each blade has chevrons engaging mating chevrons located on "T" section fingers. These fingers on each disk periphery are shaped to maintain a linear locus of neutral axis in line with the center plane of each disk, thereby avoiding bending stress. The chevron attachment load path permits much thinner disk rims which significantly reduce the assembly weight.

Associated with the chevrons on each blade are load distributing members passing through a hollow blade platform structured to the blade platform. The blade penetrates the platform into the interior of the blade platform structure.

High pressure cooling air, necessarily at high temperature, is guided to the blade interior for cooling of the blade. Separated from this high temperature air there is a low temperature, low pressure air bathing the disks. This establishes low temperature of the disks leading to higher allowable stress, and also minimizes thermal distortion.

The two thin disks are more responsive to temperature changes than a conventional single disk.

DESCRIPTION OF THE PREFERRED EMBODIMENT

Figure 1:
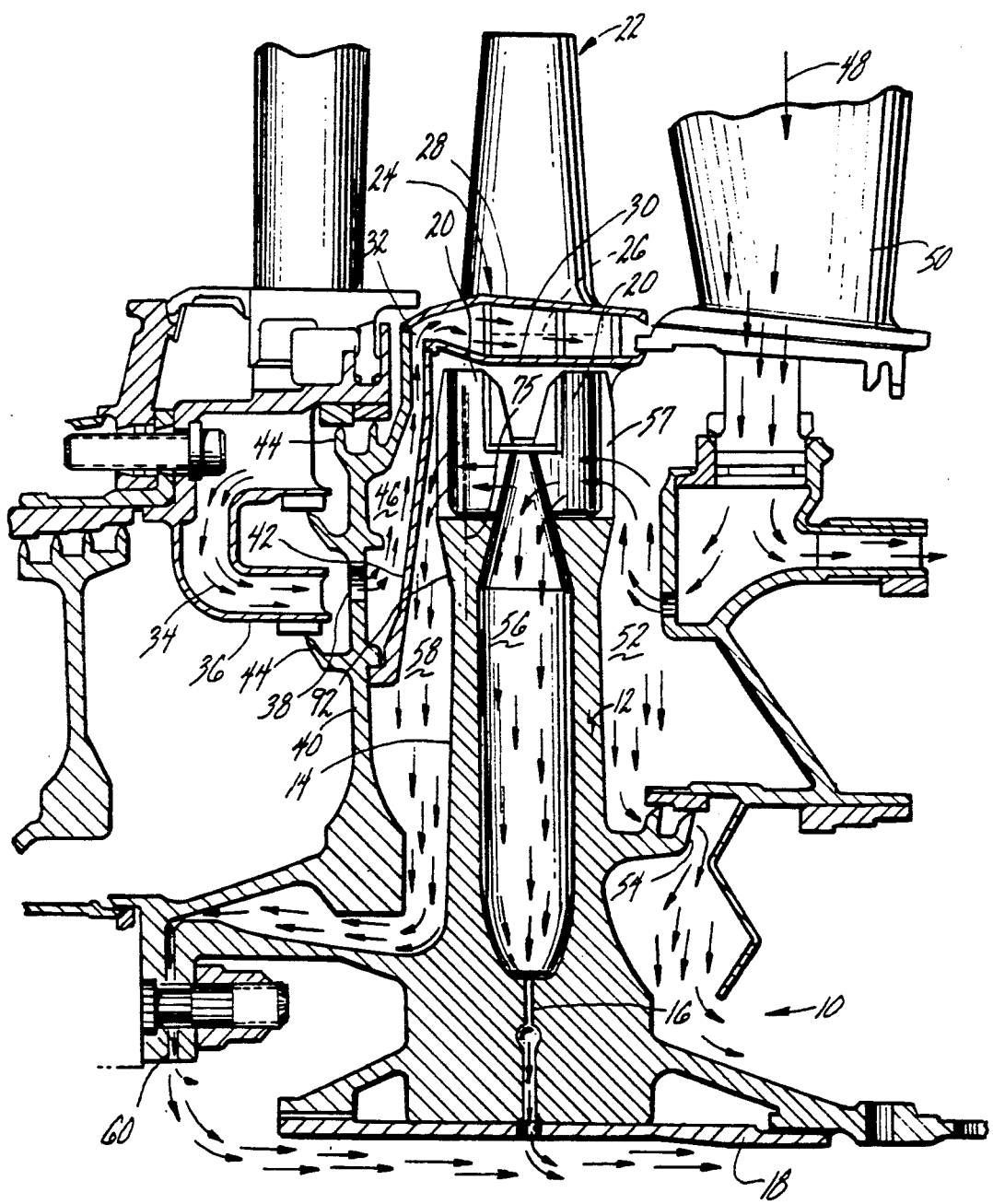
FIG. 1 is a sectional side view showing the disk blades and cooling air flow paths.
Figure 2:
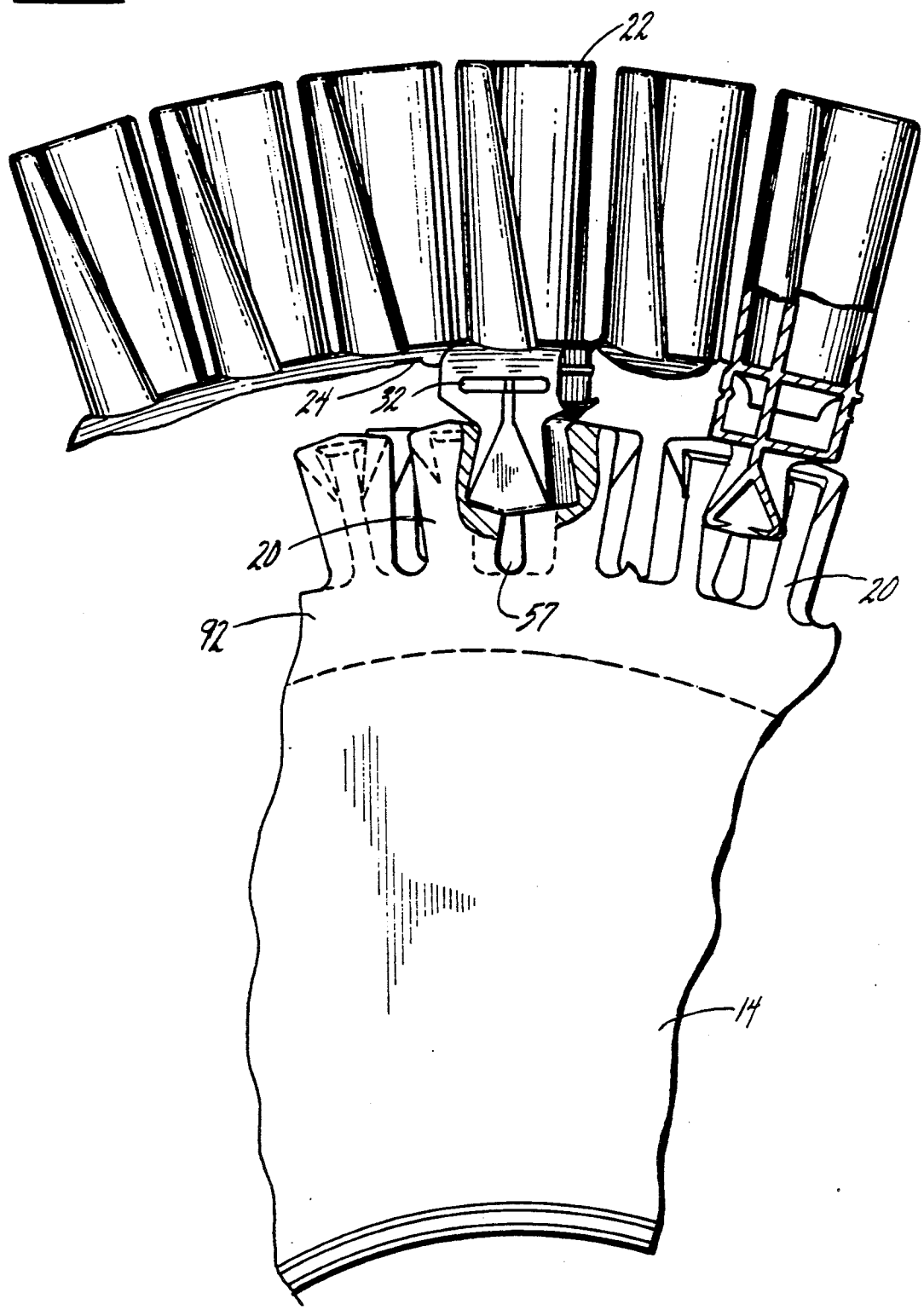
FIG. 2 is a partial axial view of the disk and blades.

The rotor structure 10 of a high temperature aircraft engine includes, for a single stage, a first turbine disk 14 and a second turbine disk 12. A coupling 16 aligns the two disks and a differential thread tie bolt 18 clamps the disks axially at the bore.

Each disk has a plurality of fingers 20 for the support of turbine blades 22. Each of the blades has a hollow platform structure 24 with a chamber 26 formed between the blade platform 28 and the base plate 30. An air inlet 32 on each blade permits the entry of cooling air into chamber 26. Blade 22 is hollow with conventional film cooling holes located in the blade so the cooling air may be passed through the blade and out into the gas path.

High pressure cooling air must be used for the blades since it must be of sufficient pressure to pass outwardly through the openings in the blade into the high pressure gas. Because of the heat of compression in the compressor this inherently is high temperature air on the order of 1200 F. Such air is obtained in the conventional manner from the air volume surrounding the combustor with the air flow 34 passing through the tangential on board injection nozzles 36. This flow passes through openings 38 in a rotating seal disk 40. An annular baffle 42 rotates with the seal disk 40 and is clamped thereto. This baffle is also sealed to the base 30 of the blade platform structure. The seal disk 40 carries various labyrinth seals 44 and is sealed to the blade platform 28 of the blade platform structure. A flow path 46 is thereby provided for passage of the cooling airflow into chamber 26. This flow of hot cooling air is isolated from the turbine disks 12 and 14.

A lower pressure and lower temperature cooling airflow 48 passes through vane 50 with a portion of the airflow passing to chamber 52 contacting one side of turbine disk 12. A portion of this air passes out through labyrinth seal 54. Another portion passes between the disk 12 and the blades into chamber 56 where it bathes the other side of disk 12 and on side of disk 14. A portion of this flow passes through the coupling 16.

In passing between the disk 12 and the blades, the cooling flow passes through passages 57 between fingers 20 and passes over live disk rim 92. This portion of the disk tends to be the hottest area since it is close to the hot gas. The live rim therefore expands, not only taking less load, but occasionally going into compression raising the stress level of the remainder of the disk. Such cooling of the live rim is therefore particularly advantageous.

Still another portion passes from chamber 56 between the disk 14 and the blades into chamber 58 where it bathes the other side of disk 14. This flow passes through openings 60 where disk 14 is secured to the remainder of the rotor structure. All of this air thereafter is discharged at a low pressure zone, for instance, downstream of the exhaust nozzle.

It can be seen that while the high pressure cooling air is used for cooling the blade itself, lower temperature cooling air bathes the turbine disks 12 and 14 maintaining them at a lower temperature. These disks are furthermore not exposed into the high temperature gas on one side which would cause thermal distortion and bending of the disk. The use of the dual disks rather than a single disk provides thinner disks and more surface for cooling. The disks are therefore more responsive than conventional disks to temperature transients, and lower thermal stresses are induced within the disks.

Figure 3:
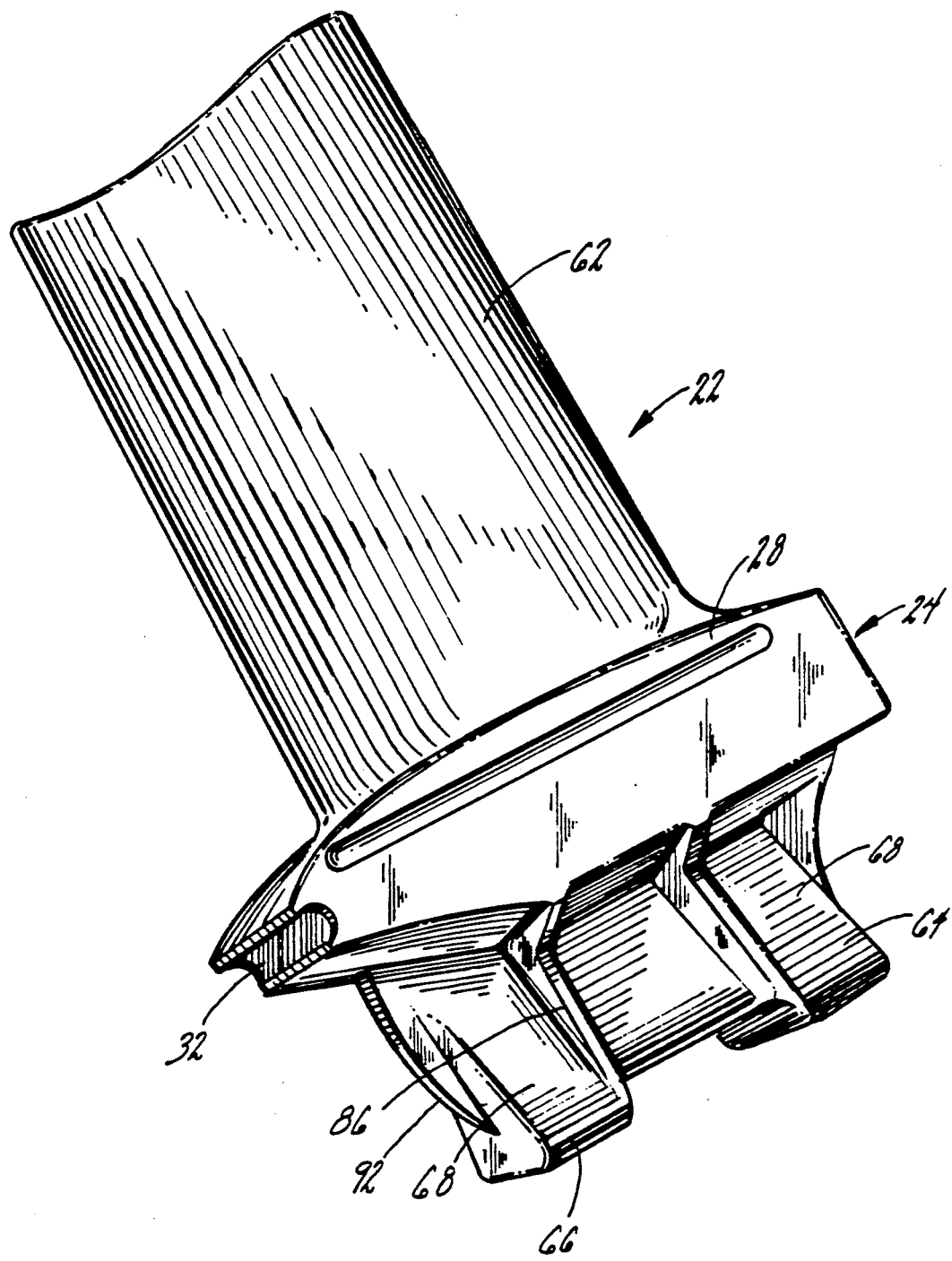
FIG. 3 is an isometric of the blade.

FIG. 3 is an isometric view of blade 22 with airfoil 62 carried on blade platform 28. The cooling air inlet 32 is also shown. The blade has blade support chevrons 64 and 66 which are the initial load carrying portions in the connection of the blade to the disk. These blade chevrons are of a delta shape so that each chevron has a blade support surface 68 on each side. The load is transmitted through the fingers of the disks to these surfaces.

Figure 4:
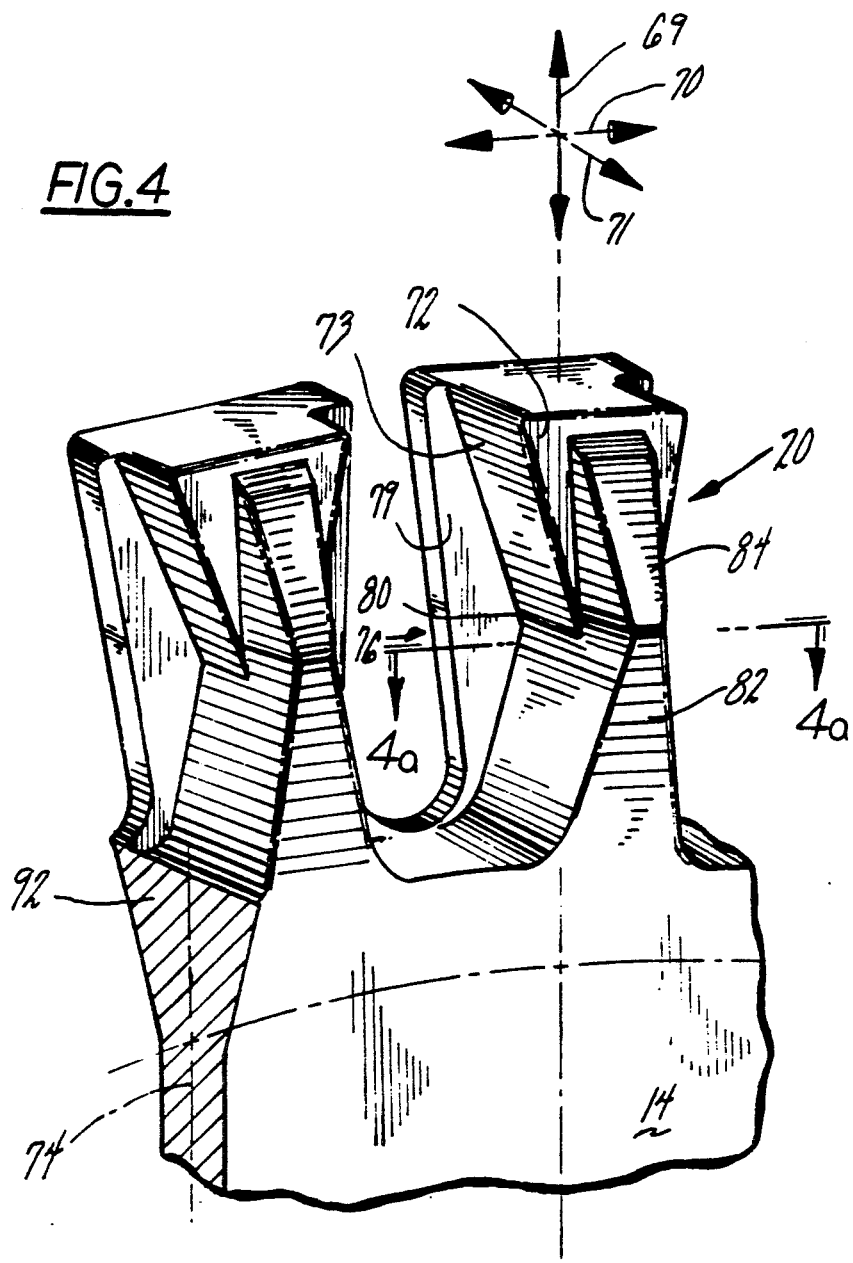
FIG. 4 is an isometric of several fingers on the disk.

FIG. 4 is an isometric view showing finger 20 on disk 14. FIG. 4 illustrates for reference purposes the radial direction 69, the circumferential direction 70 and the axial direction 71.

Each finger 20 includes a finger support chevron 72 which is contiguous with the blade support structure and which transmits the blade load to the disk. Each chevron has a finger support surface 73 on each side for this purpose. These support surfaces are located on the center plane 74 of the disk to avoid bending in the disk itself. The structure of the finger 20 is carefully arranged so that the neutral plane, or the locus 75 of the neutral axes 77 of this finger remains in line with the center plane 74 at least from its root at the main body of the disk to the chevron location.

Figure 4A:
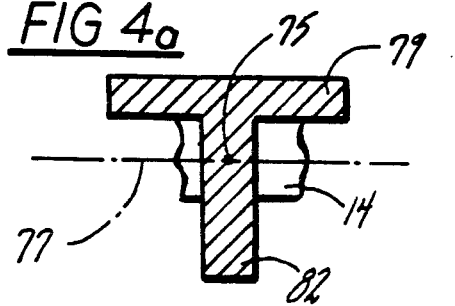
FIG. 4a is a section through a finger.

Each finger has a integral T section 76 as seen in FIG. 4a, with the head formed of a circumferentially extending web 78 which extends radially from the disk on the side of the disk remote from the other disk. This web has a dimension in the circumferential direction which increases with the radial distance, at least to the location 80 of the apex of the chevron. Maintenance of the linear locus of neutral axis 77 is obtained by sizing of the base of the T section formed by gusset 82 extending radially from the disk. This gusset has a dimension in the axial dimension increasing with the radial distance to the location of the chevron. This gusset also decreases in width to the apex 80 of the chevron. The sizing of the gusset and the web are established to maintain this linear locus of the neutral axes.

The portion of the gusset 82 beyond the apex 80 is reduced in the axial direction at the location of the chevron 72, to offset the decreasing excess material in the web 78.

The rim 84 of disk 14 is widened slightly to provide for increased disk thickness at the root of fingers 20. It is also noted that the plane of the finger support surface 72 is preferably not completely axially, but at a slight angle thereto. This is described later with respect to the mating contiguous surface of the blades.

Figure 5:
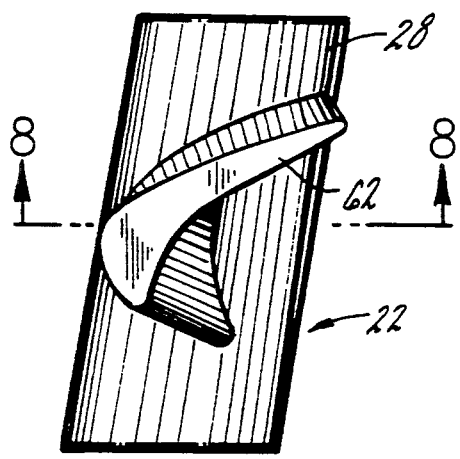
FIG. 5 is a top view of the blade.

FIG. 5 is a top view of blade 22 showing airfoil 62 in a trapezoidal shape of platform 28. Such shape of blade platform is frequently used because of the spacing and shape of the airfoils required in gas turbine engines.

Figure 6:
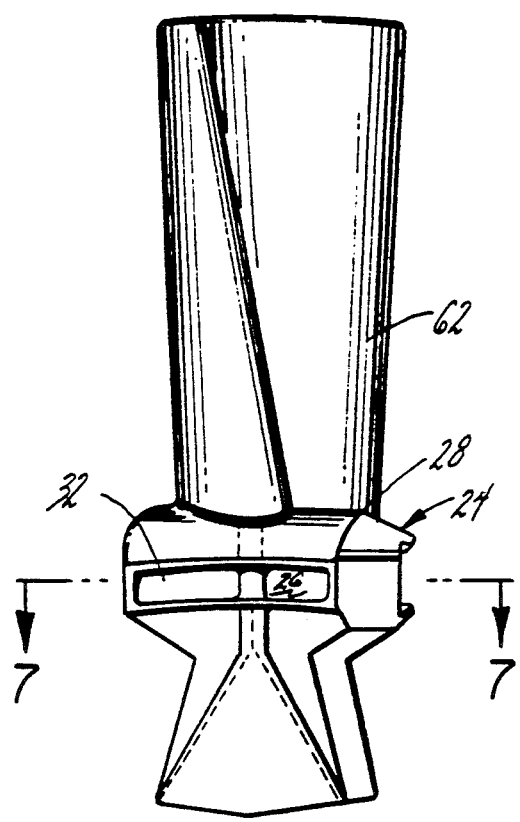
FIG. 6 is a front view of the blade.

FIG. 6 is a front view of the blade showing the blade platform structure through which section 7—7 is taken.

Figure 7:
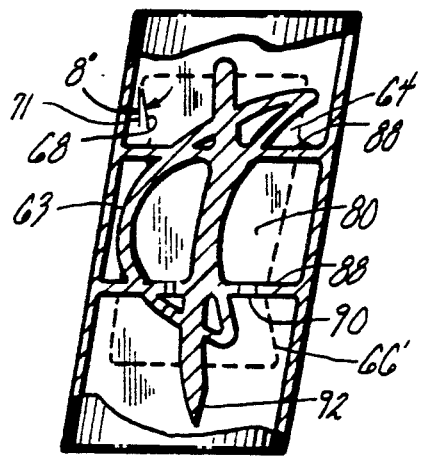
FIG. 7 is a section through the blade platform structure of FIG. 6.

Referring to FIG. 3 as well as FIG. 7 it is noted that the airfoil 62 includes airfoil extension 63 extending through blade platform 28 into the chamber 26. It is also noted that chevrons 64 and 66 are offset with respect to one another to accommodate the trapezoidal shape of the platform. Disks 12 and 14 are correspondingly offset with appropriate design of coupling 16.

Each surface of a chevron is in a plane which is substantially axial and also at an angle between 25 degrees and 60 degrees from the radial direction (between 30° and 65° from the tangential direction). The preferred angle is 55° from the tangential direction.

As illustrated in FIG. 7, the preferred structure is not precisely axial. The plane of surface 68 is about 8 degrees (or up to 10 degrees) from the axial direction 71. The slight taper creates a force drawing the twin disks together under the centrifugal loading by the blades.

It is also noted that while the chevrons 64 and 66 are offset from one another, they still maintain the substantially axially support surface at each location. They do, however, have the up to 10 degree deviation which is common to all four of the chevron surfaces for drawing the disks together.

The blade chevron load distribution structure is best seen with reference to FIGS. 3 and 7. A circumferentially extending radial wall 86 adjacent and integral with each chevron, is located on the side of each chevron toward the blade radial centerline. These radial walls 86 continue as extensions 88 through the chamber 26 to the blade platform 28. Openings 90 are provided at selected locations in the structure to permit the cooling air to pass therethrough.

An axially extending wing 92 is adjacent and integral with each blade chevron on the side of the chevron away from the blade centerline. This also extends through the chamber 26 to the blade platform.

Figure 8:
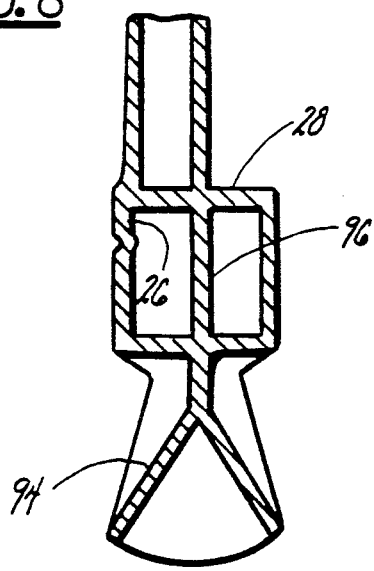
FIG. 8 is a section through FIG. 5 showing the tent structure between blade chevrons.

Further with reference to FIG. 8, a tent structure 94 may be seen which joins the two chevrons 64 and 66. This tent structure has an extension 96 also extending through chamber 26 to blade platform 28.

High blade loading is achieved with a lightweight structure using a load path which avoids any significant disk bending. Dual disks are thinner than a single disk would be and are cooled in a manner providing a good thermal response. High temperature cooling air for the blades is supplied without contact with the disks. Significant disk live weight is avoided.

I claim:

1. In a gas turbine engine;
a disk and blade arrangement comprising:
a pair of axially spaced turbine disks;
a plurality of radially extending blade retention fingers at the periphery of each disk;
a plurality of blades;
each blade having two axially spaced blade support chevrons having blade support surfaces, the plane of said support surfaces being substantially axial and at an angel between 25 degrees and 60 degrees from the radial direction;
each of said fingers having a finger support chevron having a finger support surface contiguous with a blade support surface;
said blade support surfaces and said finger support surfaces located on the center plane of a corresponding disk;
each finger shaped such that the locus of the neutral axes of said finger is substantially radial and linear from the radius of the root of said finger to the radius of contact of said finger support surface with said blade support surface;
each blade having a blade platform of trapezoidal shape;

said two support chevrons of each blade circumferentially offset while maintaining substantially axial blade support surfaces; and said disks circumferentially offset sufficient for said finger support surfaces to mate with said blade support surfaces.

2. A disk and blade arrangement as in claim 1,
the locus of neutral axes of each finger located on the center plane of the respective disk.

3. A disk and blade arrangement as in claim 2:
the plane of said blade support surfaces in the substantially axial direction being up to 10 degrees from the axial direction with the surfaces on each side of each chevron converging toward the radial centerline of the blade.

4. A disk and blade arrangement as in claim 3:
said blade having a hollow blade platform structure comprising;
a blade platform;
a radially spaced base plate;
side plates, and one closed end;
said blade including an airfoil extending through said blade platform into the platform structure interior.

5. A disk and blade arrangement as in claim 4:
blade chevron load distribution structure comprising a circumferentially extending radial wall adjacent and integral with each chevron on the side of each chevron toward the blade radial centerline;
a tent structure joining said radial walls and having an apex toward said inner plate;
radial support extensions of said radial walls into said platform structure interior; and
said tent structure extending through the interior of said hollow blade platform structures to said platform.

6. A disk and blade arrangement as in claim 5:
said radial support extensions within said hollow blade platform structure having openings therein for passage of cooling air.

7. A disk and blade arrangement as in claim 6:
an axially extending wing adjacent and integral with each blade chevron, on the side of said chevron away from said blade centerline, extending through the interior of said hollow blade platform structure to said platform.

8. A disk and blade arrangement as in claim 7:
each finger having an integral T section supporting said chevron;
the head of said T formed of a circumferentially extending web extending radially from the side of said disk remote from the other disk, and having a dimension in the circumferential direction increasing with radial distance at least to the location of said chevron;
the base of said T formed of an axial gusset extending radially from said disk, and having a dimension in the axial direction increasing with the radial distance to the location of said chevron.

9. A disk and blade arrangement as in claim 8:
the width of said gusset in the circumferential direction decreasing with radial distance, from said disk to the location of said chevron.

10. A disk and blade arrangement as in claim 2:
each finger having an integral T section supporting said chevron;
the head of said T formed of a circumferentially extending web extending radially from the side of said disk remote from the other disk, and having a dimension in the circumferential direction increasing with radial distance at least to the location of said chevron;
the base of said T formed of an axial gusset extending radially from said disk, and having a dimension in the axial direction increasing with the radial-distance to the location of said chevron.

11. A disk and blade arrangement as in claim 10:
the width of said gusset in the circumferential direction decreasing with radial distance, from said disk to the location of said chevron.

12. In a gas turbine engine;
a disk and blade arrangement comprising:
a pair of axially spaced turbine disks;
a plurality of radially extending blade retention fingers at the periphery of each disk;
a plurality of blades;
each blade having two axially spaced blade support chevrons having blade support surfaces, the plane of said support surfaces being substantially axial and at an angle between 25 degrees and 60 degrees from the radial direction;
each of said fingers having a finger support chevron having a finger support surface contiguous with a blade support surface;
said blade support surfaces and said finger support surfaces located on the center plane of a corresponding disk;
each finger shaped such that the locus of the neutral axes of said finger is substantially radial and linear from the radius of the root of said finger to the radius of contact of said finger support surface with said blade support surface; and
the plane of said blade support surfaces in the substantially axial direction being up to 10 degrees from the axial direction with the surfaces on each side of each chevron converging toward the radial centerline of the blade.

13. In a gas turbine engine;
a disk and blade arrangement comprising:
a pair of axially spaced turbine disks;
a plurality of radially extending blade retention fingers at the periphery of each disk;
a plurality of blades;
each blade having two axially spaced blade support chevrons having blade support surfaces, the plane of said support surfaces being substantially axial and at an angle between 25 degrees and 60 degrees from the radial direction;
each of said fingers having a finger support chevron having a finger support surface contiguous with a blade support surface;
said blade support surfaces and said finger support surfaces located on the center plane of a corresponding disk;
each finger shaped such that the locus of the neutral axes of said finger is substantially radial and linear from the radius of the root of said finger to the radius of contact of said finger support surface with said blade support surface;
said blade having a hollow blade platform structure comprising;
a blade platform;
a radially spaced base plate;
side plates, and one closed end; and
said blade including an airfoil extending through said blade platform into the platform structure interior.

14. A disk and blade arrangement as in claim 13:

blade chevron load distribution structure comprising a circumferentially extending radial wall adjacent and integral with each chevron on the side of each chevron toward the blade radial centerline;

a tent structure joining said radial walls and having an apex toward said inner plate;

radial support extensions of said radial walls into said platform structure interior; and said tent structure extending through the interior of said hollow blade platform structures to said platform.

15. A disk and blade arrangement as in claim 14:

said radial support extensions within said hollow blade platform structure having openings therein for passage of cooling air.

16. A disk and blade arrangement as in claim 14:

an axially extending wing adjacent and integral with each blade chevron, on the side of said chevron away from said blade centerline, extending through the interior of said hollow blade platform structure to said platform.

17. A disk and blade arrangement as in claim 13:

each finger having an integral T section supporting said chevron;

the head of said T formed of a circumferentially extending web extending radially from the side of said disk remote from the other disk, and having a dimension in the circumferential direction increasing with radial distance at least to the location of said chevron;

the base of said T formed of an axial gusset extending radially from said disk, and having a dimension in the axial direction increasing with the radial distance to the location of said chevron.

18. A disk and blade arrangement as in claim 17:

the width of said gusset in the circumferential direction decreasing with radial distance, from said disk to the location of said chevron.

19. In a gas turbine engine;

a disk and blade arrangement comprising:

a pair of axially spaced turbine disks;

a plurality of radially extending blade retention fingers at the periphery of each disk;

a plurality of blades;

each blade having two axially spaced blade support chevrons having blade support surfaces, the plane of said support surfaces being substantially axial and at an angle between 25 degrees and 60 degrees from the radial direction;

each of said fingers having a finger support chevron having a finger support surface contiguous with a blade support surface;

said blade support surfaces and said finger support surfaces located on the center plane of a corresponding disk;

each finger shaped such that the locus of the neutral axes of said finger is substantially radial and linear from the radius of the root of said finger to the radius of contact of said finger support surface with said blade support surface;

each finger having an integral T section supporting said chevron;

the head of said T formed of a circumferentially extending web extending radially from the side of said disk remote from the other disk, and having a dimension in the circumferential direction increasing with radial distance at least to the location of said chevron; and the base of said T formed of an axial gusset extending radially from said disk, and having a dimension in the axial direction increasing with the radial distance to the location of said chevron.

20. A disk and blade arrangement as in claim 19:

the width of said gusset in the circumferential direction decreasing with radial distance, from said disk to the location of said chevron.

21. A disk and blade arrangement as in claim 10:

the width of said gusset in the circumferential direction increasing with radial distance from said disk, radially outward of the start location of said chevron.

22. A disk and blade arrangement as in claim 9:

the width of said gusset in the circumferential direction increasing with radial distance from said disk, radially outward of the start location of said chevron.

* * * * *